US012585617B2

(12) United States Patent
Kwon et al.

(10) Patent No.: US 12,585,617 B2
(45) Date of Patent: Mar. 24, 2026

(54) DYNAMIC SCRIPT GENERATION FOR AUTOMATED FILING SERVICES

(71) Applicant: ADP, Inc., Roseland, NJ (US)

(72) Inventors: Bryant Kwon, Fullerton, CA (US);
Shilpa Modi, Madhya Pradesh (IN);
Srikanth Chintamaneni, Hyderabad
(IN); Phani Sista, Telangana (IN);
Joseph Dela-Cruz, Diamond Bar, CA
(US); Neeraja Patnala, Hyderabad
(IN); Younik Lee, Buena Park, CA
(US); Naresh Boorla, Hyderabad (IN)

(73) Assignee: ADP, Inc., Roseland, NJ (US)

( * ) Notice: Subject to any disclaimer, the term of this
patent is extended or adjusted under 35
U.S.C. 154(b) by 196 days.

(21) Appl. No.: 17/410,348

(22) Filed: Aug. 24, 2021

(65) Prior Publication Data

US 2023/0064194 A1     Mar. 2, 2023

(51) Int. Cl.
| | |
|---|---|
| *G06F 16/16* | (2019.01) |
| *G06F 11/07* | (2006.01) |
| *G06F 16/11* | (2019.01) |
| *G06F 16/17* | (2019.01) |
| *G06F 16/182* | (2019.01) |
| *G06Q 40/12* | (2023.01) |

(52) U.S. Cl.
CPC ........ *G06F 16/168* (2019.01); *G06F 11/0706*
(2013.01); *G06F 16/122* (2019.01); *G06F*
*16/1734* (2019.01); *G06F 16/182* (2019.01);
*G06Q 40/123* (2013.12); *G06F 2201/86*
(2013.01)

(58) Field of Classification Search
CPC ............... G06F 16/168; G06F 2201/86; G06F
16/1734; G06Q 20/207; G06Q 40/00;
G06Q 40/10; G06Q 40/12; G06Q 40/123
See application file for complete search history.

(56) References Cited

U.S. PATENT DOCUMENTS

| | | | | |
|---|---|---|---|---|
| 8,032,822 B1 * | 10/2011 | Artamonov | .......... | G06Q 40/123 |
| | | | | 715/255 |
| 8,156,018 B1 * | 4/2012 | Quinn | .................. | G06Q 40/123 |
| | | | | 705/19 |
| 8,788,407 B1 * | 7/2014 | Singh | ................... | G06F 16/355 |
| | | | | 705/38 |

(Continued)

*Primary Examiner* — Hares Jami
*Assistant Examiner* — Jedidiah P Ferrer
(74) *Attorney, Agent, or Firm* — Foley & Lardner LLP

(57) ABSTRACT

A system and method for dynamic script generation for
automated filing services is provided. In embodiments, a
method includes: initiating a clickstream recording of an
electronic document filing interface of a remote platform
based on a triggering event; generating a clickstream record-
ing of the electronic document filing interface, wherein the
clickstream recording comprising a recording of a naviga-
tion of the electronic document filing interface through
multiple steps of a document filing process, wherein the
clickstream recording is in the form of scripts associated
with each of the multiple steps of the document filing
process; and generating automated filing instructions for the
electronic document filing interface using the clickstream
recording, the automated filing instructions enabling com-
puter automated submission of one or more documents to
the remote platform via the electronic document filing
interface.

15 Claims, 5 Drawing Sheets

(56) References Cited

U.S. PATENT DOCUMENTS

| | | | |
|---|---|---|---|
| 8,893,108 B1 * | 11/2014 | Pfeiffer | G06F 8/65 |
| | | | 705/31 |
| 9,286,567 B1 * | 3/2016 | Martinez | G06Q 40/123 |
| 9,412,017 B1 * | 8/2016 | Huang | G06F 40/174 |
| 11,119,906 B1 * | 9/2021 | Edouard | G06Q 20/3829 |
| 2002/0103663 A1 * | 8/2002 | Bankier | G06Q 20/00 |
| | | | 709/224 |
| 2002/0174073 A1 * | 11/2002 | Nordman | G06F 21/6254 |
| | | | 705/64 |
| 2004/0243641 A1 * | 12/2004 | Allen | G06Q 40/03 |
| | | | 707/999.107 |
| 2007/0050844 A1 * | 3/2007 | Lebel | G06F 11/3466 |
| | | | 726/13 |
| 2012/0096559 A1 * | 4/2012 | Ifrim | G06F 21/64 |
| | | | 726/26 |
| 2015/0127364 A1 * | 5/2015 | Long | G06Q 40/08 |
| | | | 705/2 |
| 2017/0132181 A1 * | 5/2017 | Van As | G06F 40/143 |
| 2019/0132203 A1 * | 5/2019 | Wince | G06F 16/215 |
| 2021/0042638 A1 * | 2/2021 | Novotny | G06F 11/3438 |
| 2021/0264103 A1 * | 8/2021 | Jenson | G06F 40/174 |

* cited by examiner

200

215

205

210        210        210

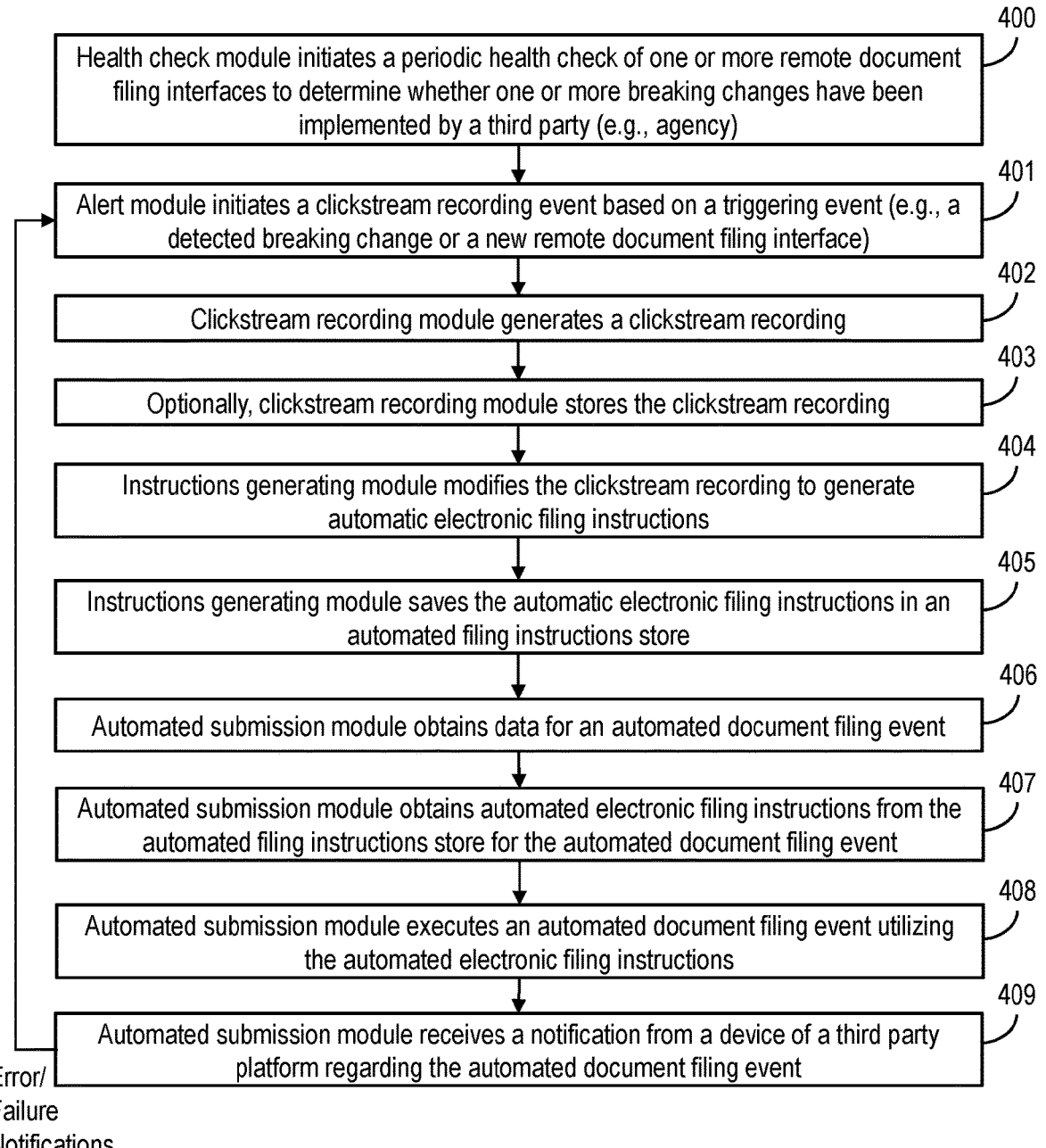

400

Health check module initiates a periodic health check of one or more remote document filing interfaces to determine whether one or more breaking changes have been implemented by a third party (e.g., agency)

401

Alert module initiates a clickstream recording event based on a triggering event (e.g., a detected breaking change or a new remote document filing interface)

402

Clickstream recording module generates a clickstream recording

403

Optionally, clickstream recording module stores the clickstream recording

404

Instructions generating module modifies the clickstream recording to generate automatic electronic filing instructions

405

Instructions generating module saves the automatic electronic filing instructions in an automated filing instructions store

406

Automated submission module obtains data for an automated document filing event

407

Automated submission module obtains automated electronic filing instructions from the automated filing instructions store for the automated document filing event

408

Automated submission module executes an automated document filing event utilizing the automated electronic filing instructions

409

Automated submission module receives a notification from a device of a third party platform regarding the automated document filing event Error/
Failure
Notifications

FIG. 4

DYNAMIC SCRIPT GENERATION FOR AUTOMATED FILING SERVICES

TECHNICAL FIELD

The present disclosure relates generally to automated document submissions and, more particularly, to a method and system for dynamic script generation for automated document filing services.

BACKGROUND

Third party filing services have been developed to provide automatic electronic document filing services for consumers. One type of filing service provides e-filing services to individuals and groups. E-filing is a process of submitting electronic tax documents to federal, state and local government agencies via the internet or direct connection in lieu of paper documents. Government agencies provide various websites with user interfaces configured to enable e-filing of documents. Different user interfaces utilize different methods and processes for submitting documents, and may utilize a variety of transmission protocols. Supported transmission types include, for example, Secure File Transfer Protocol (SFTP), Hypertext Transfer Protocols (HTTP/s), Simple Object Access Protocol (SOAP), Representational State Transfer (REST), web services, etc.

When a government agency or the like makes changes or updates to their web portal, any software code for automated electronic filing through the web portal may need to be updated, preferably before an automated electronic filing event fails due to the change/update. Unplanned website changes that cause automated filing failures can occur multiple times per month on average, resulting in extensive and complex recovery efforts. In the event of unplanned failures due to changes, automated electronic filing services have been reliant on manual efforts and many layers of hand-offs between cross functional teams to reconcile missed/failed transmissions manually. Such efforts are extremely labor intensive and error prone.

SUMMARY

In a first aspect of the present disclosure, a computer-implemented method includes: initiating a clickstream recording of an electronic document filing interface of a remote platform based on a triggering event; generating a clickstream recording of the electronic document filing interface, wherein the clickstream recording comprising a recording of a navigation of the electronic document filing interface through multiple steps of a document filing process, wherein the clickstream recording is in the form of scripts associated with each of the multiple steps of the document filing process; and generating automated filing instructions for the electronic document filing interface using the clickstream recording, the automated filing instructions enabling computer automated submission of one or more documents to the remote platform via the electronic document filing interface.

In another aspect of the present disclosure, there is a computer program product that includes one or more computer readable storage media having program instructions collectively stored on the one or more computer readable storage media. The program instructions are executable to: periodically perform a health check of an electronic document filing interface of a remote platform to determine whether any breaking changes to the electronic document filing interface have been implemented by the remote platform; and initiate a clickstream recording of the electronic document filing interface based on a triggering event, the clickstream recording comprising a recording of a navigation of the electronic document filing interface through multiple steps of a document filing process.

In a further aspect of the present disclosure, there is a computer system including a processor, a computer readable memory, one or more computer readable storage media, and program instructions collectively stored on the one or more computer readable storage media. The program instructions are executable to: periodically perform a health check of an electronic document filing interface of a remote platform to determine whether any breaking changes to the electronic document filing interface have been implemented by the remote platform; initiate a clickstream recording of the electronic document filing interface based on the health check, wherein the clickstream recording comprises a recording of a navigation of the electronic document filing interface through multiple steps of a document filing process, and wherein the clickstream recording is in the form of scripts associated with each of the multiple steps of the document filing process; and execute an automated document filing event via the electronic document filing interface utilizing stored automated filing instructions to automatically file one or more documents with the remote platform via the electronic document filing interface, wherein the stored automated filing instructions comprise the clickstream recording.

BRIEF DESCRIPTION OF THE DRAWINGS

Aspects of the present disclosure are described in the detailed description which follows, in reference to the noted plurality of drawings by way of non-limiting examples of exemplary embodiments of the present disclosure.

FIG. 4 depicts an exemplary flow for a process in accordance with aspects of the present disclosure.

DETAILED DESCRIPTION OF ASPECTS OF THE INVENTION

Figure 1:
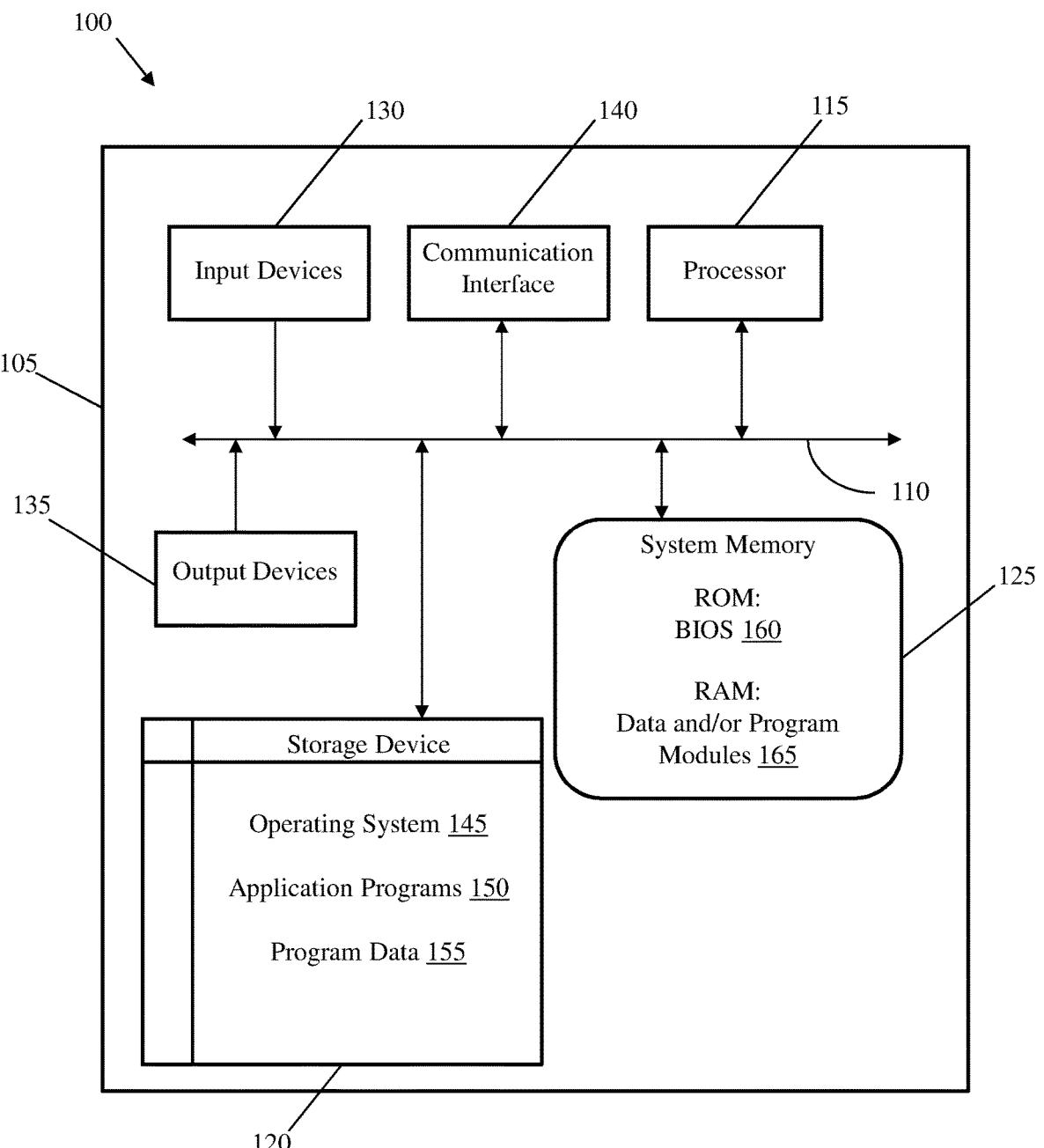
FIG. 1 is an illustrative architecture of a computing system implemented in embodiments of the present disclosure.

The present disclosure relates generally to automated document submissions and, more particularly, to a method and system for dynamic script generation for automated document filing services. In accordance with aspects of the present disclosure, a system provides automated integration and file-based transmission services for document submissions, as well as automated monitoring of web portal systems to proactively detect potential breaking changes that would result in failure of an automated document submission event. These document submissions can be provided to federal, state and local government agencies.

Presently, many third parties, e.g., government agencies, do not provide a non-production text/validation environment (Question Answer (QA), test, staging, etc.) that would enable automated file-based transmission services to test a document submission website/portal safely prior to releasing document transmission software changes to accommo-
date changes to the agency websites/portals. It is common
for third party sources, e.g., government agencies, to deploy
breaking changes without notifying all interested parties
(e.g., private sector stakeholders), and often such changes
are deployed just ahead of major quarter-end and year-end
filing periods/deadlines. The term breaking change as used
herein refers to a change to an electronic document filing
interface (e.g., web portal) that results in failure of an
automated filing event by a filing system configured to work
with the electronic document filing interface prior to the
breaking change. When a third party, e.g., government
agency, goes live with a change to their web portal, any
software code for automated electronic filing through the
web portal may need to be updated, preferably before an
automated electronic filing event fails due to a breaking
change. It should be recognized that although this applica-
tion is discussed with reference to a governmental agency,
this technology is applicable for any changes to any web
portal that requires updating.

Examples of breaking changes include alterations to web
user interface (UI) layouts, form field changes, process/flow
changes, password changes, protocol changes, cipher/secu-
rity changes, changes resulting in connectivity issues, and
anti-bot measures like Completely Automated Public Turing
test to tell Computers and Humans Apart (CAPTCHA), etc.
Such breaking changes can negatively impact clients of
automatic e-filing services (e.g., delaying time-sensitive
electronic filings), and expose the automatic e-filing services
and/or clients to potential penalties (e.g., government inter-
est fees or Service-level Agreement (SLA) violation penal-
ties).

Unplanned website changes can occur multiple times per
month on average. Such changes may break integration
processes utilizing websites, and causes transmission fail-
ures that can result in extensive and complex recovery
efforts. In the event of unplanned failures due to changes,
e.g., jurisdiction-initiated changes, automated e-filing ser-
vices have been reliant on manual efforts and many layers of
hand-offs between cross functional teams to reconcile
missed/failed transmissions manually. Such efforts are
extremely labor intensive and error prone.

Bulk filing services may enable clients to integrate and
automate complex filing processes across disparate web
portals (e.g., 2000 unique agency integrations that have to be
maintained separately via the general-purpose scripting lan-
guage PHP). Electronic filing (e.g., e-filing) volumes may be
low during non-peak filing periods, and orders of magnitude
higher during peak quarter and year-ending filing periods.
Bulk filing services and scalability performance are particu-
larly effected by high-volume filing requirements associated
with seasonal filing deadlines. For example, the overhead of
maintenance of disparate PHP scripts for various third party
web portals can be extremely high, requiring hours of
dedicated development time to support changes in the event
of a breaking change introduced by the third party, e.g., a
governmental agency. Attempts to solve these problems
have primarily depended on error prone manual efforts to:
analyze logs across various servers; sift through hundreds of
emails per day; track failures; and update multiple teams of
the failures with numerous hand offs between teams, each of
whom lack visibility to each other's portion of an electronic
filing transaction, and each of whom have no democratized
access to the data representing these transactions.

Advantageously, aspects of the present disclosure provide
a system and method to proactively generate alerts indicat-
ing a breaking change to a web portal or user interface, e.g., an agency's e-filing web portal or user interface. Implemen-
tations of the disclosure provide for dynamic updating of an
automated electronic filing system based on the alerts,
thereby providing a technical solution to the technical prob-
lem of failed automated filing events due to unexpected
breaking changes. Aspects of the disclosure enable changes
to integration scripts (not runtime code changes) without the
need for any server restarts to enable the changes. Moreover,
embodiments of the disclosure provide a system and method
for detecting unplanned website changes ahead of high
volume cycles, e.g., filing cycles, and updating submission
and retrieval processes quickly with minimal effort. Imple-
mentations enable an automated electronic document filing
system to scale up or down based on actual filing loads (e.g.,
based on utilizing, not based on anticipated static peak
metrics), thereby minimizing cost and maximizing resource
utilization efficiency. Advantageously, embodiments of the
disclosure enable changes to software code to be imple-
mented quickly on demand as needed (e.g., in response to a
filing failure), even during peak filing periods.

Implementations of the present disclosure may be a
system, a method, and/or a computer program product. The
computer program product may include a computer readable
storage medium (or media) having computer readable pro-
gram instructions thereon for causing a processor to carry
out aspects of the present disclosure.

FIG. 1 is an illustrative architecture of a computing
system 100 implemented in embodiments of the present
disclosure. The computing system 100 is only one example
of a suitable computing system and is not intended to
suggest any limitation as to the scope of use or functionality
of the disclosure. Also, computing system 100 should not be
interpreted as having any dependency or requirement relat-
ing to any one or combination of components illustrated in
computing system 100.

Figure 2:
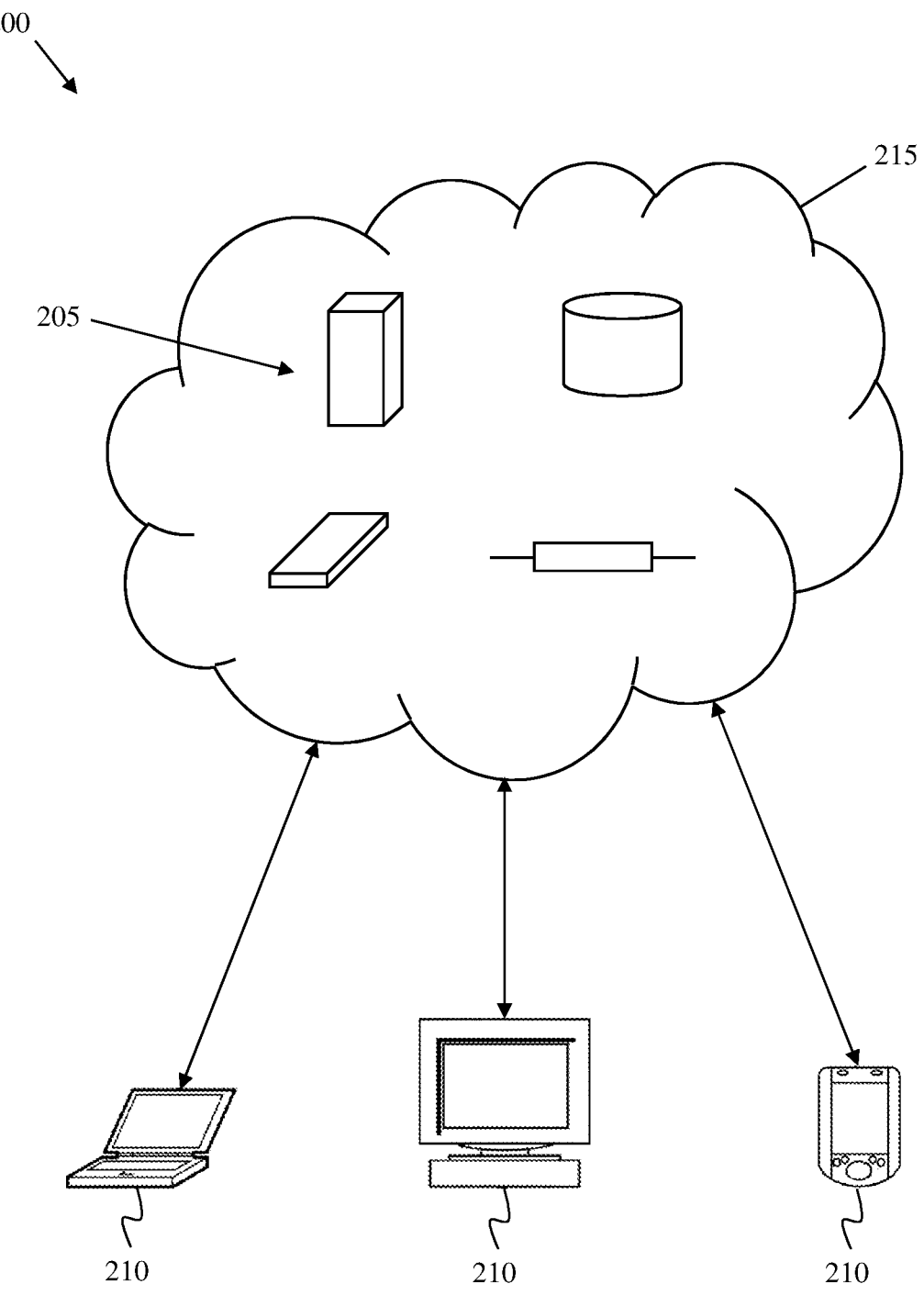
FIG. 2 shows an exemplary cloud computing environment in accordance with aspects of the present disclosure.

As shown in FIG. 1, computing system 100 includes a
computing device 105. The computing device 105 can be
resident on a network infrastructure such as within a cloud
environment as shown in FIG. 2, or may be a separate
independent computing device (e.g., a computing device of
a third party service provider). The computing device 105
may include a bus 110, a processor 115, a storage device
120, a system memory (hardware device) 125, one or more
input devices 130, one or more output devices 135, and a
communication interface 140.

The bus 110 permits communication among the compo-
nents of computing device 105. For example, bus 110 may
be any of several types of bus structures including a memory
bus or memory controller, a peripheral bus, and a local bus
using any of a variety of bus architectures to provide one or
more wired or wireless communication links or paths for
transferring data and/or power to, from, or between various
other components of computing device 105.

The processor 115 may be one or more processors or
microprocessors that include any processing circuitry opera-
tive to interpret and execute computer readable program
instructions, such as program instructions for controlling the
operation and performance of one or more of the various
other components of computing device 105. In embodi-
ments, processor 115 interprets and executes the processes,
steps, functions, and/or operations of the present disclosure,
which may be operatively implemented by the computer
readable program instructions. For example, processor 115
enables the computing device 105 to automatically file
electronic documents based on stored automated filing
instructions, even when changes have been made to a web
portal or user interface without any user notification. In embodiments, the electronic documents may be, for example, tax documents filed with a government agency.

In embodiments, processor 115 may receive input signals from one or more input devices 130 and/or drive output signals through one or more output devices 135. The input devices 130 may be, for example, a keyboard, touch sensitive user interface (UI), etc., as is known to those of skill in the art such that no further description is required for a complete understanding of the present disclosure. The output devices 135 can be, for example, any display device, printer, etc., as is known to those of skill in the art such that no further description is required for a complete understanding of the present disclosure.

The storage device 120 may include removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 105 in accordance with the different aspects of the present disclosure. In embodiments, storage device 120 may store operating system 145, application programs 150, and program data 155 in accordance with aspects of the present disclosure.

The system memory 125 may include one or more storage mediums, including for example, non-transitory media such as flash memory, permanent memory such as read-only memory ("ROM"), semi-permanent memory such as random access memory ("RAM"), any other suitable type of storage component, or any combination thereof. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM.

The communication interface 140 may include any transceiver-like mechanism (e.g., a network interface, a network adapter, a modem, or combinations thereof) that enables computing device 105 to communicate with remote devices or systems, such as a mobile device or other computing devices such as, for example, a server in a networked environment, e.g., cloud environment. For example, computing device 105 may be connected to remote devices or systems via one or more local area networks (LAN) and/or one or more wide area networks (WAN) using communication interface 140.

As discussed herein, computing system 100 may be configured to perform one or more of the following functions according to implementations of the disclosure:

(i) initiate period health checks of one or more remote document filing interfaces;

(ii) initiate clickstream recordings of websites based on a triggering event;

(iii) generate a clickstream recording; store a clickstream recording;

(iv) modify the clickstream recording to generate automatic electronic filing instructions;

(v) save the automatic filing instructions;

(vi) obtain data for an automated document filing event;

(vii) obtain automated electronic filing instructions for the automated document filing event; execute the automated document filing event; and/or (viii) receive notifications from the remote document filing interfaces.

In particular, computing device 105 may perform tasks (e.g., process, steps, methods and/or functionality) in response to processor 115 executing program instructions contained in a computer readable medium, such as system memory 125. The program instructions may be read into system memory 125 from another computer readable medium, such as data storage device 120, or from another device via the communication interface 140 or server within or outside of a cloud environment. In embodiments, an operator may interact with computing device 105 via the one or more input devices 130 and/or the one or more output devices 135 to facilitate performance of the tasks and/or realize the end results of such tasks in accordance with aspects of the present disclosure. In additional or alternative embodiments, hardwired circuitry may be used in place of or in combination with the program instructions to implement the tasks, e.g., steps, methods and/or functionality, consistent with the different aspects of the present disclosure. Thus, the steps, methods and/or functionality disclosed herein can be implemented in any combination of hardware circuitry and software.

FIG. 2 shows an exemplary cloud computing environment 200 in accordance with aspects of the disclosure. Cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with the service provider. In embodiments, one or more aspects, functions and/or processes described herein may be performed and/or provided via cloud computing environment 200.

As depicted in FIG. 2, cloud computing environment 200 includes cloud resources 205 that are made available to client devices 210 via a network 215, such as the Internet. Cloud resources 205 can include a variety of hardware and/or software computing resources, such as servers, databases, storage, networks, applications, and platforms. Cloud resources 205 may be on a single network or a distributed network. Cloud resources 205 may be distributed across multiple cloud computing systems and/or individual network enabled computing devices. Client devices 210 may comprise any suitable type of network-enabled computing device, such as servers, desktop computers, laptop computers, handheld computers (e.g., smartphones, tablet computers), set top boxes, and network-enabled hard drives. Cloud resources 205 are typically provided and maintained by a service provider so that a client does not need to maintain resources on a local client device 210. In embodiments, cloud resources 205 may include one or more computing system 100 of FIG. 1 that is specifically adapted to perform one or more of the functions and/or processes described herein.

Cloud computing environment 200 may be configured such that cloud resources 205 provide computing resources to client devices 210 through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 210. For example, cloud resources 205 can provide both SaaS and IaaS to a client device 210. Cloud resources 205 may be configured, in some cases, to provide different service models to different client devices 210. For example, cloud resources 205 can provide SaaS to a first client device 210 and PaaS to a second client device 210.

Cloud computing environment 200 may be configured such that cloud resources 205 provide computing resources to client devices 210 through a variety of deployment models, such as public, private, community, hybrid, and/or any other cloud deployment model. Cloud resources 205 may be configured, in some cases, to support multiple deployment models. For example, cloud resources 205 can provide one set of computing resources through a public deployment model and another set of computing resources through a private deployment model.

In embodiments, software and/or hardware that performs one or more of the aspects, functions and/or processes described herein may be accessed and/or utilized by a client (e.g., an enterprise or an end user) as one or more of an SaaS, PaaS and IaaS model in one or more of a private, community, public, and hybrid cloud. Moreover, although this disclosure includes a description of cloud computing, the systems and methods described herein are not limited to cloud computing and instead can be implemented on any suitable computing environment.

Cloud resources 205 may be configured to provide a variety of functionality that involves user interaction. Accordingly, a user interface (UI) can be provided for communicating with cloud resources 205 and/or performing tasks associated with cloud resources 205. The UI can be accessed via a client device 210 in communication with cloud resources 205. The UI can be configured to operate in a variety of client modes, including a fat client mode, a thin client mode, or a hybrid client mode, depending on the storage and processing capabilities of cloud resources 205 and/or client device 210. Therefore, a UI can be implemented as a standalone application operating at the client device in some embodiments. In other embodiments, a web browser-based portal can be used to provide the UI. Any other configuration to access cloud resources 205 can also be used in various implementations.

Figure 3:
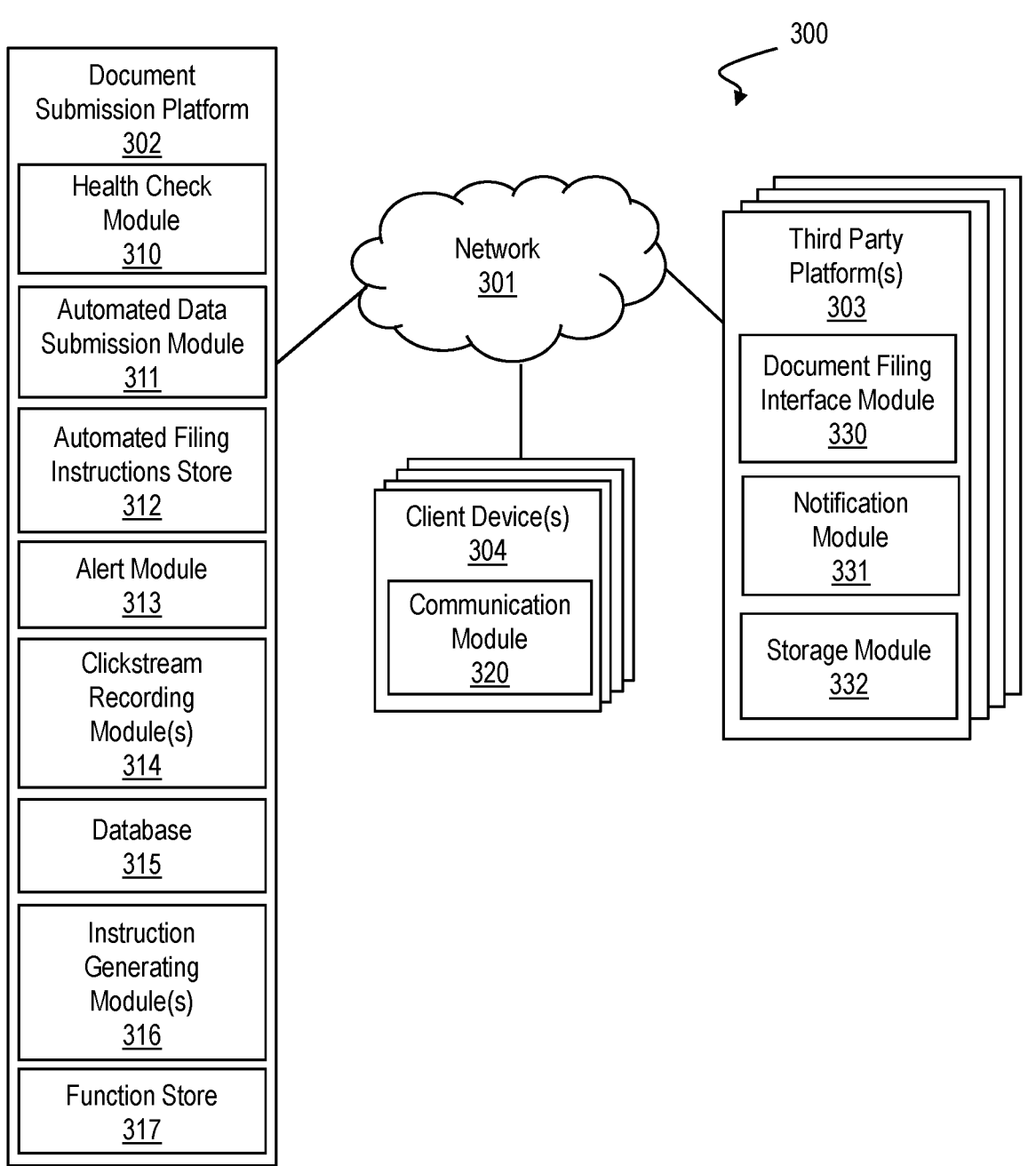
FIG. 3 depicts an exemplary electronic filing environment in accordance with aspects of the present disclosure.

FIG. 3 depicts an exemplary electronic document filing environment in accordance with aspects of the present disclosure. More specifically, FIG. 3 depicts an exemplary electronic document filing environment 300 that illustrates functionality of aspects of the present disclosure. The environment 300 includes a network 301 (e.g., Internet) interconnecting a document submission platform 302 with one or more third party platforms 303 and one or more client devices 304. In implementations, the document submission platform 302 is configured to provide automated electronic document filing services for consumers, in order to file documents (e.g., tax documents) electronically with one or more third parties, e.g., government agencies (via the platforms 303). The electronic document filing may rely on information and documents provided from multiple disparate service providers (e.g., cloud-based service providers), such as wage garnishment documents and health care compliance documents.

The document submission platform 302 may comprise one or more cloud resources 205 within the cloud computing environment 200 of FIG. 2, and may comprise one or more computing devices including the elements of computing device 105 of FIG. 1. In implementations, the document submission platform 302 is a cloud network platform providing cloud-based electronic filing services to consumers (e.g., via the client devices 210 of FIG. 2) or services to internal consumers via a local area network (LAN) or wide area network (WAN) or virtual private cloud (VPC) as further non-limiting examples.

In one example, the document submission platform 302 includes automation software tools to provide advanced integration capabilities between third party web portals or user interface, e.g., government agency websites and back-end systems (e.g., a tax engine, information technology (IT) services, wage garnishment services, healthcare compliance services, etc.) to automate document submissions, e.g., e-file tax documents, and fetch acknowledgements (notifications) to/from agency jurisdictions. Embodiments of the disclosure enable automated electronic filing of documents with agencies utilizing transmission types including Secure File Transfer Protocol (SFTP), Hypertext Transfer Protocols (HTTP/s), Simple Object Access Protocol (SOAP), Representational State Transfer (REST), web services, fast data eXhange (FDX), secure shell (SSH), and others. In implementations, the document submission platform 302 enables the submission of electronic filing (e.g., e-filing) transactions from cloud-based service products (e.g., a tax engine, information technology (IT) services, wage garnishment services, healthcare compliance services, etc.) requiring integration, and file transmission handling to and from government agency websites (e.g., provided by the platforms 303) that provide electronic filing submissions and multi-level acknowledgements through the third party web-sites (e.g., government websites).

The document submission platform 302 may comprise one or more modules for performing functions in accordance with embodiments of the present disclosure. In implementations, the document submission platform 302 includes one or more of: a health check module 310, an automated data submission module 311 configured to access an automated filing instructions store 312, an alert module 313, one or more clickstream recording modules 314 with access to a database 315, and one or more instruction generating modules 316 with access to a function store 317, wherein each of the above-identified modules may comprise one or more program modules such as program modules 165 described with respect to FIG. 1.

In embodiments, the health check module 310 is configured to monitor one or more electronic document filing interfaces (e.g., websites or web portals) for breaking changes. As set forth above, the term breaking change as used herein refers to a change to an electronic document filing interface (e.g., websites or web portal) that results in failure of an automated filing event by a filing system configured to work with the electronic document filing interface prior to the breaking change. In other words, a breaking change is a change to an electronic document filing interface that would result in failure of an automated filing event using automated filing instructions configured to execute the automated filing event via the electronic document filing interface prior to the breaking change. In embodiments, the automated data submission module 311 is configured to automatically upload electronic documents and/or data to one or more third party platforms 303 via an electronic document filing interface of the third party (e.g., government agency), based on automated filing instructions stored in the automated filing instructions store 312.

In aspects of the present disclosure, the alert module 313 is configured to determine that a breaking change has occurred to an electronic document filing interface or that a new electronic document filing interface has been introduced to the document submission platform 302, and initiate a clickstream recording of the associated electronic document filing interface by one of the clickstream recording modules 314. In implementations, the one or more clickstream recording modules 314 are configured to generate a clickstream recording of an electronic filing process for a particular electronic document filing interface. In embodiments, the clickstream recording may be saved in the database 315 and transformed at one of the instruction generating modules 316 into new or updated automated filing instructions. The one or more instruction generating modules 316 may utilize re-usable function templates stored in the function store 317 to transform a clickstream recording into automated filing instructions. New or updated automated filing instructions may be saved in the automated filing instructions store 312 for use by the automated data submission module 311 during automated document submission events.

Each of the platforms 303 may comprise one or more cloud resources 205 within the cloud computing environment 200 of FIG. 2, and may comprise one or more computing devices including the elements of computing device 105 of FIG. 1. In implementations, the one or more platforms 303 are cloud network platforms enabling electronic filing of documents by consumers (e.g., via the client devices 210 of FIG. 2) and third party filing services (e.g., via the document submission platform 302). In implementations, each platform 303 is associated with a particular party such as, for example, federal, state or local government agency or jurisdiction, or a subgroup thereof. In one example, the platform 303 comprises computing devices and resources of the Internal Revenue Service (IRS) enabling electronic document submissions by consumers and third party filers.

Each of the platforms 303 may comprise one or more modules for performing functions in accordance with embodiments of the present disclosure. In implementations, the platforms 303 each include one or more of: a document filing interface module 330 providing an electronic filing interface (e.g., website or web portal) through which users can electronically submit information and documents; a notification module 331 configured to send notifications to electronic document filing customers (e.g., confirmation of filing, error notification, etc.); and a storage module 332 configured to receive information uploaded by the agency platform 303. In embodiments, each of the above-identified modules may comprise one or more program modules such as program modules 165 described with respect to FIG. 1.

The client devices 304 may comprise the client devices 210 in the cloud environment 200 of FIG. 2, or may comprise one or more cloud resources 205 of FIG. 2. Further, the client devices 304 may comprise one or more computing devices including the elements of computing device 105 of FIG. 1. In implementations, one or more of the client devices 304 belong to consumers of the electronic document filing services of the document submission platform 302. In embodiments, one or more of the client devices 304 comprise backend computing devices providing services to consumers (e.g., wage garnishment services, healthcare compliances services, etc.), wherein the one or more client devices 304 are configured to provide the document submission platform 302 with data and/or electronic documents (e.g., tax forms, healthcare documents, etc.) associated with an electronic document filing event.

Additionally, each of the client devices 304 may comprise one or more modules for performing functions in accordance with embodiments of the present disclosure. In implementations, the client devices 304 each include a communication module 320 configured to communicate with one or more modules of the document submission platform 302 and provide information regarding an electronic document filing event (e.g., personal information of the consumer, electronic documents, etc.) to the documents submission platform 302. In embodiments, the communication module 320 may comprise one or more program modules such as program modules 165 described with respect to FIG. 1.

In further implementations, one or more modules of the document submission platform 302 utilize one or more of the following application programming interfaces (APIs) to implement method steps of the disclosure: an e-file submission API; an acknowledgement fetch API; a password reset API; an agency checker API; a single agency health check API; and an elastic container service (ECS) health check API. As is understood by those of skill in the art, an API is a software intermediary that allows two applications to talk to one another such that no further explanation is required herein for a complete understanding of the present disclosure.

In embodiments, the document submission platform 302, platforms 303, and client devices 304 may include additional or fewer modules than those shown in FIG. 3. In embodiments, separate modules may be integrated into a single module. Additionally, or alternatively, a single module may be implemented as multiple modules. Moreover, the quantity of devices and/or networks in the environment is not limited to what is shown in FIG. 3. In practice, the environment 300 may include additional devices and/or networks; fewer devices and/or networks; different devices and/or networks; or differently arranged devices and/or networks than illustrated in FIG. 3.

FIG. 4 depicts an exemplary flow for a process in accordance with aspects of the present disclosure. The exemplary flow can be illustrative of a system, a method, and/or a computer program product and related functionality implemented on the computing system of FIG. 1, in accordance with aspects of the present disclosure. The computer program product may include computer readable program instructions stored on computer readable storage medium (or media). The computer readable storage medium may include the one or more storage medium as described with regard to FIG. 1, e.g., non-transitory media, a tangible device, etc. The method, and/or computer program product implementing the flow of FIG. 4 can be downloaded to respective computing/processing devices, e.g., computing system of FIG. 1 as already described herein, or implemented on a cloud infrastructure as described with regard to FIG. 2. Accordingly, the processes associated with each flow of the present disclosure can be implemented by special purpose hardware-based systems that perform the specified functions or acts or carry out combinations of special purpose hardware and computer instructions.

At 400, the health check module 310 of the document submission platform 302 initiates periodic health checks of one or more remote document filing interfaces (e.g., a website or web portal provided by document filing interface module 330 of a platform 303) to determine whether one or more breaking changes have been made to the remote document filing interface. In implementations, the health check module 310 initiates a health check of a document filing interface by the automated data submission module 311, wherein the automated data submission module 311 executes a partial automated electronic filing process (e.g., at least one step of an automated electronic filing process) using automated electronic filing instructions associated with the third party platform stored in the automated filing instructions store 312. In implementations, the partial automated electronic filing process comprises steps for electronic filing one or more documents via a document filing interface of a third party platform 303 up to, but excluding, the actual filing of a document via the web portal. In one example, the health check module 310 monitors government agency websites via synthetically executed steps up to a login step, detects website navigation changes, and notifies one or more groups or teams (e.g., via the alert module 313 at step 401) in the event of a failure requiring remediation. It should be understood that periodic health checks by the health check module 310 may detect a breaking change to a document filing interface of a third party platform 303 prior to the failure of an actual automated electronic filing event conducted through the document filing interface of the agency.

At 401, the alert module 313 of the document submission platform 302 initiates a clickstream recording event based on a triggering event. In implementations, the triggering event comprises the alert module 313 determining that a breaking change to a document filing interface of agency third party platform 303 has occurred, or that a new document filing interface (e.g., a new agency web portal) has been introduced to the document submission platform 302. In embodiments, the alert module 313 initiates a clickstream recording event by sending a notification to a device of user (e.g., a computing device of an operational support team member) with information regarding the clickstream recording event (e.g., a link to the web portal of an agency, or other identifying information regarding the document filing interface at issue).

In implementations, the alert module 313 determines that a breaking change has been detected by the health check module 310 during a periodic health check of step 400. For example, in aspects of the disclosure, the alert module 313 determines that a breaking change has occurred when a failure of an automated electronic filing process is determined by a module of the document submission platform 302. In embodiments, the automated data submission module 311 automatically notifies the alert module 313 when a failure of an automated electronic filing process has occurred.

In implementations, personnel may manually enter information regarding identified or potential breaking changes, or information regarding one or more new document filing interfaces added to the document submission platform 302. In one example, when a new web portal is identified through which documents are to be electronically filed by the document submission platform 302, the alert module 313 is informed manually or via an automated notification from another module of the document submission platform 302. Some examples of failure reasons that may result in the alert module 313 initiating a clickstream recording include: third party platform connectivity issues; third party platform website changes, third party platform unexpected page; third party platform authentication code issue; third party platform time out issue, no acknowledgements are available in third party platform; third party platform password issue; generation data groups (GDG) issue, data card error; OB failed but MF initiated the fetch job; and transmission failure.

At 402, a clickstream recording module 314 of the document submission platform 302 executes a click stream recording (a recording of the navigation of a document filing interface) in response to initiation of the clickstream recording event at step 401, thereby generating a clickstream recording (e.g., web portal navigation recording) in the form of document submission scripts. In implementations, as a user manually progresses through various electronic document filing steps (e.g., user login, data entry, document uploading, etc.) of a particular third party filing interface, the clickstream recording module 314 generates software scripts associated with each of the filing steps. In one example, the recording comprises a recording in the form of Selenium® document submission scripts. Selenium® is an open source software framework for browser web automation (enabling the automated data submission module 311 to simulate user actions on web portals), and is a registered trademark of Software Freedom Conservancy, Inc. In implementations the scripts are in the form of Java® script, an object-oriented computer programming language. Java® is a registered trademark of Oracle and/or its affiliates.

In implementations, the clickstream recording module 314 comprises a web browser plugin of a user device on the document submission platform configured to record a user's actions on a website and generate a corresponding Java® script output that is injected into a wrapper template for execution via a Selenium® framework. In one example, the plugin is a Katalon® plugin, which is a registered trademark of KMS Technology, Inc., and the browser utilized is Google Chrome™ browser. In embodiments, the clickstream recording comprises between ten (10) and twenty (20) lines of code for third party platform 303 submission steps. In contrast, PHP script employed by legacy systems for the same steps contain more than 200 lines of code. Thus, aspects of the disclosure provide a low-code solution to address automated electronic document filing software updates.

Optionally, at 403, the clickstream recording module 314 of the document submission platform 302 causes the recording of step 402 to be stored in a database (e.g., database 315) of the document submission platform 302. In instances, the recording is associated with a new electronic filing procedures of a third party, e.g., governmental agency. In other instances, the recording is associated with an updated electronic filing procedure of a third party, and the recording may be saved over an old recording associated with the electronic filing procedure of the third party before it was updated.

At 404, an instruction generating module 316 of the document submission platform 302 modifies the clickstream recording of step 402 to generate automatic electronic filing instructions for the document filing interface at issue. In implementations, the instruction generating module 316 is on a user device of a user (e.g., an operational support team member), who obtains the saved recording (e.g., in the form of Selenium® document submission scripts), and inserts business logic or functions into the recording to generate the automatic electronic filing instructions.

For example, the instruction generating module 316 inserts one or more predetermined functions (e.g., from the function store 317) into the recording of step 402. In aspects, the instruction generating module 316 can insert the predetermined functions based on input from a user (e.g., operational support team member), or automatically based on stored rules. The functions may be in the form of reusable function templates (Java® script) from a saved repository of reusable function templates (e.g., the function store 317). Reusable functions may be, for example, conditional logic for exception handling.

At 405, the instruction generating module 316 of the document submission platform 302 saves the automatic electronic filing instructions generated at 404 in the automated filing instructions store 312, replacing any previous versions of the automatic electronic filing instructions. It should be understood that different automatic electronic filing instructions may be saved for a particular remote document filing interface at issue, wherein each of the different automatic electronic filing instructions are associated with a different type or category of filing (e.g., different tax forms, etc.).

At 406, the automated data submission module 311 obtains data for an automated document filing event. In implementations, the automated data submission module 311 obtains the data from a communication module 320 of one or more respective client devices 304. The data may include any information regarding an automated document filing event, including electronic documents, identifying information of the client, login information of the client, etc.

At 407, the automated data submission module 311 of the document submission platform 302 accesses the automated filing instructions store 312 to obtain the automatic electronic filing instructions needed for the type of automated document filing event (e.g., instructions associated with the third party platform 303, and type of filing with the third party platform 303). At 408, that automated data submission module 311 of the document submission platform 302 executes the automated document filing event via a document filing interface of agency third party platform 303 utilizing the automated electronic filing instructions. The automated data submission module 311 may utilize recorded site navigation Java® script produced by Katalon® to submit tax documents and retrieve acknowledgements without human intervention.

At 409, the automated data submission module 311 of the document submission platform 302 receives a notification from the remote document filing interface of the third party platform 303 in response to the automated document filing event. In implementations, the notification module 331 of the third party platform 303 sends the notification to the automated data submission module 311. In one example, the notification module 331 of the third party platform 303 sends the automated data submission module 311 a notification that one or more documents were successfully uploaded to the storage module 332 of the third party platform 303. In embodiments, the notification comprises a notification indicating that an error occurred during the automated document filing event, or indicating that the automated document filing event failed. In embodiments, when the notification indicates that an error has occurred, the automated data submission module 311 notifies the alert module 313 according to step 401, which initiates a clickstream recording event of the remote document filing interface at issue.

Figure 5A:
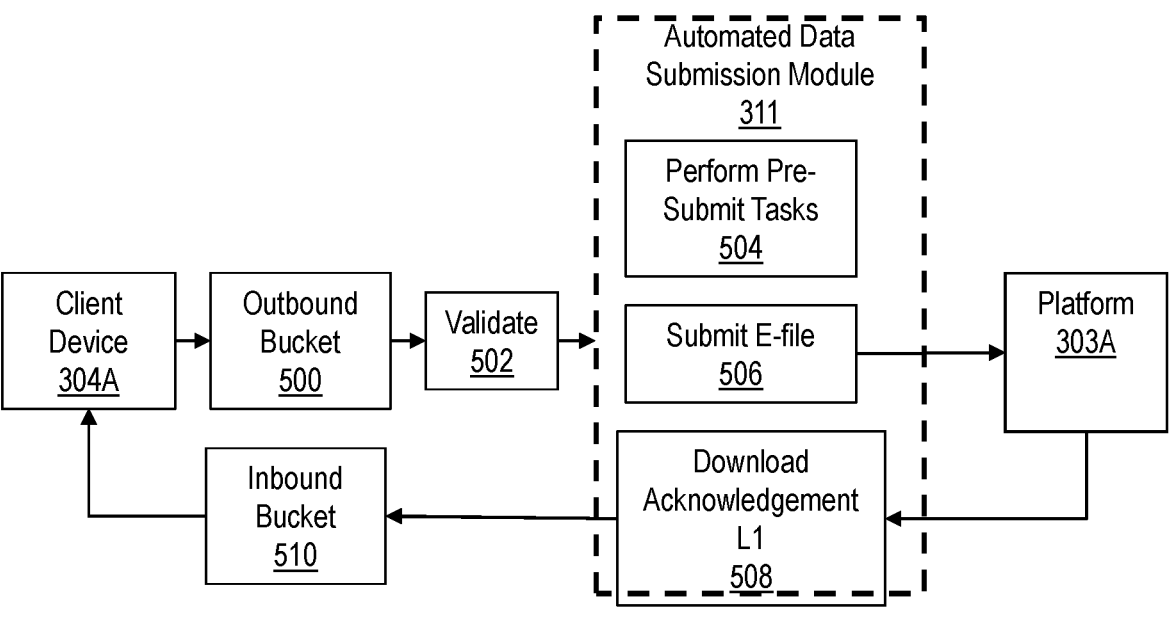
FIGS. 5A and 5B depict an exemplary use scenario in a cloud-based environment.
Figure 5B:
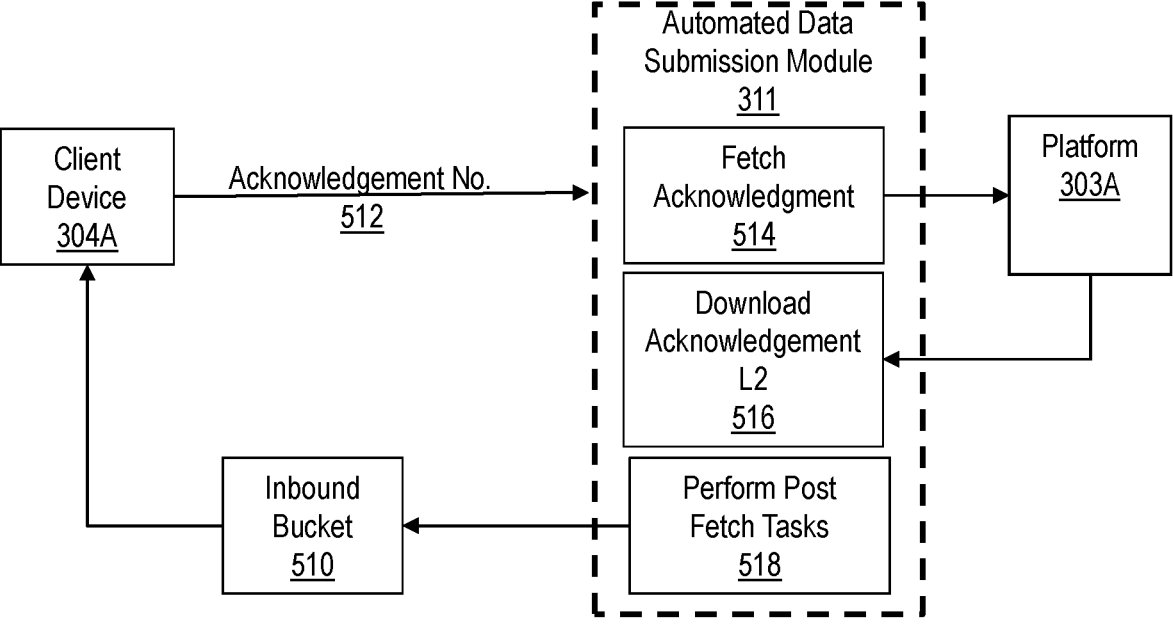

FIGS. 5A and 5B depict an exemplary use scenario in a cloud-based environment. The scenario of FIGS. 5A and 5B may be implemented in the environment 300 of FIG. 3. FIG. 5A depicts a client device 304A providing data for an automated electronic filing event utilizing a filing interface of platform 303A. As an example, the client device 304A is a mainframe computing device of the document submission platform 302 of FIG. 3. In the scenario of FIG. 5A, a cloud-based storage service is utilized as part of the document submission platform 302 of FIG. 3.

In the example of FIG. 5A, the client device 304A provides data associated with an electronic filing event (e.g., documents to be filed) to an outbound data storage bucket 500 of a cloud storage service. The term data storage bucket as used herein refers to a basic container that holds data in a cloud storage environment, which is utilized to organize and control access to data. Upon validation of the automated data submission module 311 at block 502, the automated data submission module 311 can access the data in the outbound bucket 500. At block 504, the automated data submission module 311 performs pre-submission tasks (e.g., formatting or transforming data) to prepare the data to be submitted to a platform 303A via an automated electronic filing (e.g., e-filing) submission process represented at block 506. The electronic submission process may utilize SSH File Transfer Protocol (SFTP), WebSocket protocol (WS), hypertext transfer protocol (HTTP) or other communication protocols.

Once the platform 303A successfully downloads the data associated with the electronic filing submission from the automated data submission module 311, the platform 303A provides a level 1 (L1) download acknowledgement (push notification) to the automated data submission module 311 at block 508, and the automated data submission module 311 then sends the L1 download acknowledgement to an inbound bucket 510. The authorized client device 304A may obtain the L1 download acknowledgement from the inbound bucket 510.

In the example of FIG. 5B, at block 512, the client device 304A sends an acknowledgment number to the automated data submission module 311, causing the automated data submission module 311 to issue a communication to the platform 303A to fetch a second level (L2) download acknowledgement. The communication may utilize SFTP, WS, HTTP or other communication protocols. In response to the communication, the platform 303A sends a level 2 (L2) download acknowledgment at block 516 indicating the data was downloaded to the platform 303A. The automated data submission module 311 initiates the performance of post fetch tasks at block 518 to generate post-fetch data, which is sent to the inbound bucket 510 for consumption by the client device 304A.

Based on the above, it should now be understood that embodiments of the disclosure may automate website navigation (screen scraping) and submission of electronic filing (e.g., e-filing) documents to third party platforms, such as government agencies, without manual intervention. Implementations of the disclosure utilize Selenium®-enabled scripts which provide "low code" high return on investment (ROI) (e.g., require less software code and software coding resources to build and deploy scripts) compared to legacy "high code" systems utilizing only the general-purpose scripting language PHP. Such legacy systems typically require a highly skilled worker in a continuous integration/continuous delivery (CI/CD) pipeline to work for multiple days to modify PHP script to address changes to an agency document filing interface.

Moreover, the disclosure provides a highly productive system, wherein for every agency jurisdiction of interest and every filing type (e.g., form type), the system can update and/or generate script for automated filing events within hours. In implementations, the housing of automated filing instructions (scripts) in an automated filing instructions store 312 outside of an automated data submission module 311 enables the automated data submission module 311 to access the automated filing instructions on the fly as needed to execute an automated electronic filing event, without the need for a deployment process to deploy each of the automated filing instructions. Also, the disclosure comprises event-driven architecture permitting the document submission platform 302 to scale up or down based on filing volume utilizing a natively integrated managed services ecosystem. Advantageously, the disclosure results in the reduction in electronic filing transmission failures caused by unplanned interface changes (breaking changes).

The foregoing examples have been provided merely for the purpose of explanation and are in no way to be construed as limiting of the present disclosure. While aspects of the present disclosure have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present disclosure in its aspects. Although aspects of the present disclosure have been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A computer-implemented method of dynamic script generation for automated document filing services, comprising:

detecting, by one or more processing circuits, responsive to monitoring an electronic document filing interface of a remote platform, a triggering event that comprises a breaking change in a protocol used to establish communication with the electronic document filing interface for submitting a document associated with a document type, the breaking change in the protocol to cause a subsequent failure of an automated filing event with the electronic document filing interface based at least on a filing system to submit the automated filing event being configured for a different version of the electronic document filing interface prior to the breaking change in the protocol;

generating, by the one or more processing circuits, responsive to detecting the triggering event, a clickstream recording of a navigation of the electronic document filing interface through one or more steps of a document filing process with the electronic document filing interface, and the clickstream recording includes one or more scripts associated with the one or more steps of the document filing process;

generating, by the one or more processing circuits, automated filing instructions for the electronic document filing interface using the clickstream recording to account for the triggering event, the automated filing instructions to provide a computer automated submission of one or more documents having the document type to the remote platform via the electronic document filing interface;

storing, by the one or more processing circuits, the automated filing instructions in a repository:

accessing, by the one or more processing circuits, the automated filing instructions from the repository; and executing, by the one or more processing circuits, the automated filing event via the electronic document filing interface utilizing the automated filing instructions to automatically file the one or more documents having the document type with the remote platform via the electronic document filing interface.

2. The computer-implemented method of claim 1, wherein the triggering event is an introduction of an updated version of the electronic document filing interface.

3. The computer-implemented method of claim 1, further comprising:

detecting, by the one or more processing circuits, the triggering event based on a failed electronic filing event utilizing the electronic document filing interface.

4. The computer-implemented method of claim 1, further comprising:

periodically performing, by the one or more processing circuits, a health check of the electronic document filing interface to determine whether any breaking changes to the electronic document filing interface have been implemented by the remote platform; and determining, by the one or more processing circuits, that the breaking change has occurred to the electronic document filing interface.

5. The computer-implemented method of claim 4, wherein the automated filing instructions overcome the breaking change such that the automated filing instructions are configured to successfully execute a new automated filing event via the electronic document filing interface.

6. The computer-implemented method of claim 1, wherein the clickstream recording comprises a web browser plugin.

7. A computer program product comprising one or more non-transitory computer readable storage media having program instructions collectively stored on the one or more non-transitory computer readable storage media, the program instructions executable to:

periodically perform a health check of an electronic document filing interface of a remote platform to determine whether any breaking changes to the electronic document filing interface have been implemented by the remote platform;

detect, responsive to performance of the health check, a triggering event that comprises a breaking change in a protocol used to establish communication with the electronic document filing interface for submitting a document having a document type, the breaking change in the protocol to cause a subsequent failure of an automated document filing event with the electronic document filing interface based at least on a filing system to submit the automated document filing event being configured for a different version of the electronic document filing interface prior to the breaking change in the protocol;

initiate, responsive to detection of the triggering event, a clickstream recording of a navigation of the electronic document filing interface through one or more steps of a document filing process with the electronic document filing interface, the clickstream recording includes one or more scripts associated with the one or more steps of the document filing process;

generate automated filing instructions for the electronic document filing interface using the clickstream recording to account for the triggering event, the automated filing instructions to provide a computer automated submission of one or more documents having the document type to the remote platform via the electronic document filing interface;

store the automated filing instructions in a repository;

access the automated filing instructions from the repository; and execute the automated document filing event via the electronic document filing interface utilizing the automated filing instructions to automatically file the one or more documents having the document type with the remote platform via the electronic document filing interface, wherein the automated filing instructions comprise the clickstream recording.

8. The computer program product of claim 7, wherein the program instructions are executable to:

modify, using one or more stored function templates, the clickstream recording, wherein modification of the clickstream recording generates the automated filing instructions for the electronic document filing interface.

9. The computer program product of claim 7, wherein the triggering event is an introduction of an updated version of the electronic document filing interface.

10. The computer program product of claim 7, wherein the triggering event is based on a failed electronic filing event utilizing the electronic document filing interface.

11. The computer program product of claim 7, wherein the triggering event is based on a determination that the breaking change has occurred to the electronic document filing interface.

12. The computer program product of claim 7, wherein the program instructions are executable to:

generate the clickstream recording to include a web browser plugin.

13. A system comprising:

a processor, a computer readable memory, one or more computer readable storage media, and program instructions collectively stored on the one or more computer readable storage media, the program instructions executable to:

periodically perform a health check of an electronic document filing interface of a remote platform to determine whether any breaking changes to the electronic document filing interface have been implemented by the remote platform;

detect detection, responsive to performance of the health check, a triggering event that comprises a breaking change in a protocol used to establish communication with the electronic document filing interface for submitting a document having a document type, the breaking change in the protocol to cause a subsequent failure of an automated document filing event with the electronic document filing interface based at least on a filing system to submit the automated document filing event being configured for a different version of the electronic document filing interface prior to the breaking change in the protocol;

initiate, responsive to detection of the triggering event, a clickstream recording of a navigation of the electronic document filing interface through one or more steps of a document filing process with the electronic document filing interface, the clickstream recording includes one or more scripts associated with the one or more steps of the document filing process;

generate automated filing instructions for the electronic document filing interface using the clickstream recording to account for the triggering event, the automated filing instructions to provide a computer automated submission of one or more documents having the document type to the remote platform via the electronic document filing interface;

store the automated filing instructions in a repository;

access the automated filing instructions from the repository; and execute the automated document filing event via the electronic document filing interface utilizing the automated filing instructions to automatically file the one or more documents having the document type with the remote platform via the electronic document filing interface, wherein the automated filing instructions comprise the clickstream recording.

14. The system of claim 13, wherein the clickstream recording is generated to include a web browser plugin.

15. The system of claim 13, wherein the program instructions are further executable to:

modify, using one or more stored function templates, the clickstream recording, wherein modification of the clickstream recording generates the automated filing instructions for the electronic document filing interface.

\*   \*   \*   \*   \*